United States Patent
Hopkins et al.

(10) Patent No.: US 6,276,478 B1
(45) Date of Patent: Aug. 21, 2001

(54) ADHERENT ROBOT

(75) Inventors: Kathleen Garrubba Hopkins, 421 Chelsea Ct., Pittsburgh, PA (US) 15241; Dennis L. Thompson, Canonsburg; James Bour, Pittsburgh, both of PA (US)

(73) Assignee: Kathleen Garrubba Hopkins, Pittsburgh, PA (US)

( * ) Notice: Subject to any disclaimer, the term of this patent is extended or adjusted under 35 U.S.C. 154(b) by 0 days.

(21) Appl. No.: 09/505,409

(22) Filed: Feb. 16, 2000

(51) Int. Cl.[7] .................................................. B60B 39/00
(52) U.S. Cl. ............................ 180/164; 180/901; 15/1.7; 114/222
(58) Field of Search ..................... 114/222; 180/164, 180/7.1, 901, 8.3, 8.5; 248/683, 55, 205.5–205.9, 206.2–206.3, 309.3, 346.2, 362, 503, 363; 269/21; 15/1.7; 198/866; 901/1

(56) References Cited

U.S. PATENT DOCUMENTS

| | | | |
|---|---|---|---|
| 3,601,248 | * 8/1971 | Gerard | 198/866 |
| 3,906,572 | * 9/1975 | Winn | 115/1.7 |
| 3,946,692 | * 3/1976 | Sierra et al. | 114/222 |
| 3,973,711 | 8/1976 | Perego | 228/32 |
| 4,079,694 | * 3/1978 | Galinou | 118/207 |
| 4,095,378 | * 6/1978 | Urakami | 51/425 |
| 4,667,555 | 5/1987 | Lisec | 83/879 |
| 4,669,915 | * 6/1987 | Shatto, Jr. | 405/191 |
| 4,785,902 | 11/1988 | Ochiai | 180/164 |
| 4,835,355 | 5/1989 | Niinivaara et al. | 219/72 |
| 4,926,957 | 5/1990 | Urakami | 180/164 |
| 4,971,591 | 11/1990 | Raviv et al. | 446/177 |
| 5,161,631 | * 11/1992 | Urakami | 180/164 |
| 5,194,032 | 3/1993 | Garfinkel | 446/178 |
| 5,429,009 | 7/1995 | Wolfe et al. | 73/865.8 |
| 5,451,135 | 9/1995 | Schempf et al. | 414/674 |
| 5,811,055 | * 9/1998 | Geiger | 266/49 |
| 5,839,532 | * 11/1998 | Yoshiji et al. | 180/164 |
| 5,890,250 | 4/1999 | Lange et al. | 15/50.3 |
| 5,897,796 | 4/1999 | Forrest | 219/121.64 |
| 5,947,051 | * 9/1999 | Geiger | 114/313 |

* cited by examiner

Primary Examiner—Anne Marie Boehler
Assistant Examiner—Daniel Yeagley
(74) Attorney, Agent, or Firm—William L. Krayer (57) ABSTRACT

A robot capable of moving against gravity uses at least one vacuum cup assembly having a port for applying a lubricant on the working surface so the cup may slide on the surface as the robot is maneuvered with the aid of powered wheels. The wheels and vacuum cut assemblies are coordinated to move on varied surfaces. The robot module may be equipped with various task-performing assemblies, and may be employed in caravans, trains, or separately in swarms.

20 Claims, 9 Drawing Sheets

ADHERENT ROBOT

TECHNICAL FIELD

This invention relates to remotely controlled devices. The remotely controlled devices are able to adhere to flat or curved surfaces, including significantly inclined and even backwardly leaning surfaces, and to maneuver on them to perform a variety of tasks. The invention includes the use of specially designed vacuum cups and a lubricant to facilitate sliding on the surface.

BACKGROUND OF THE INVENTION

Our invention is particularly designed to meet the needs of the shipbuilding industry, in that our robots are adept at climbing the sides of ships' hulls to inspect, clean (including scraping and/or removing of barnacles and ocean scum), paint, and weld them and to perform any other function one may wish to perform on a ship's hull from a readily manipulable, adherent robot, even on a very steep or even backwardly slanted surface. While my invention is particularly good for performing such tasks on ships' hulls, it may be used in any environment requiring such a remotely controlled device, whether or not the surface tends to curve backwardly and upwards. Various approaches have been proposed for accomplishing such tasks. See, for example, Perego's U.S. Pat. No. 3,973,711, describing a magnetic crawler for soldering. It has been known to make and use remotely controlled devices which adhere to a surface by vacuum. See, for example, Lisec's U.S. Pat. No. 4,667,555 disclosing such a device for cutting glass, the more versatile traveling device of Urakami described in U.S. Pat. No. 4,926,957, and Ochiai's U.S. Pat. No. 4,785,902, showing suction cups which can be slightly tilted to maneuver the device which carries them. The reader may also be interested in U.S. Pat. Nos. 4,817,653, 5,293,887, and 4,828,059, also generally within the field.

In U.S. Pat. No. 4,971,591, Raviv and Davidovitz propose a "vehicle with vacuum traction" which facilitates the sliding of a vacuum cup along a surface, while the vacuum is supporting a certain amount of weight, either by using a low surface friction material in the vacuum cup itself, particularly the rim portion, or by placing a flexible sheet of low surface friction material under the cup. One cannot rely on the low surface friction of such a material for long, however, under industrial use conditions. See also the device of Lange and Kerr described in U.S. Pat. No. 5,890,250. They use a "grabber/slider vacuum cup" in a cleaning system which sprays cleaning and rinsing liquids on the surface. Wolfe et al, in U.S. Pat. No. 5,429,009, coordinate the movement and activation of several vacuum cups to manipulate a robot on a surface.

Such prior art machines and devices are generally not very effective on rough or slimy surfaces. The art is in need of a reliable, versatile robot capable of performing various tasks on inhospitable and steeply inclined surfaces.

SUMMARY OF THE INVENTION

We have designed a robotic vehicle for use on steep inclines and even upside down, which will maneuver and move easily over the surface, and is capable of performing all sorts of tasks. The vehicle preferably has at least one, but frequently a plurality of vacuum cups, preferably specially designed as described herein, including means for feeding lubricant to the surface, and particularly to the surface occupied by the vacuum cup(s). Unlike the Raviv et al patent discussed above, my system does not require vacuum cup materials having low coefficients of friction, or a sheet of low friction plastic interposed between the vehicle and the surface, and is not unduly subject to wear.

Our invention includes one or more vacuum cups comprising a flexible, (preferably shallow bell-shaped) body, a port therein for a vacuum source, at least substantially annular ridge, preferably two or more concentric ridges, projecting downwardly therefrom for intimately contacting a base surface, and at least one port for introducing lubricant to the interface of at least one of the ridges and the base surface.

Our invention also includes a remotely controlled vehicle including a chassis, at least one vacuum cup as described above, and means for attaching a task-performing device to the chassis. Movement is provided by independently powered wheels which may be mounted separately or in modules together with the vacuum cups. The chassis may be rigid or more or less articulated or hinged. If it is articulated or hinged, the points of articulation or hinging may be powered or not. As will be seen below, a boomerang shape is preferred.

Our invention is useful not only for performing remote tasks on the hulls of ships, but also for inspecting, cleaning and painting, for example, domes, water towers, chemical plants and reactors, storage tanks including large petroleum product storage tanks, bridges and difficultly accessible surfaces on the inside and outside of buildings and other structures.

DETAILED DESCRIPTION OF THE INVENTION

Figure 1A:
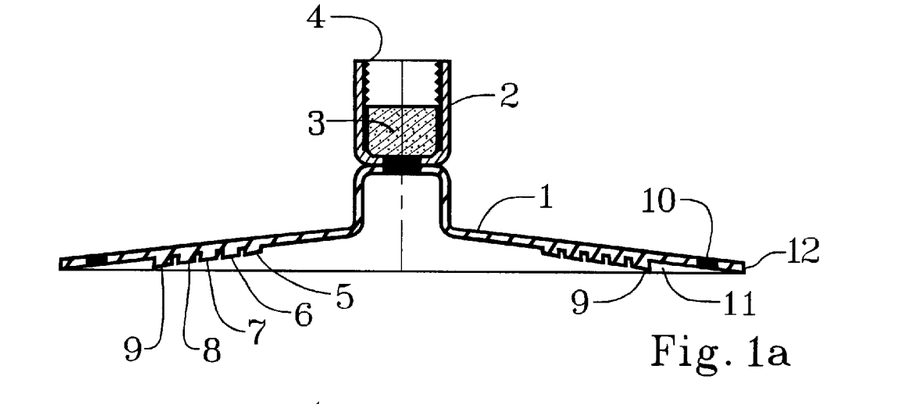
FIGS. 1a, 1b, and 1c are side sectional views of our preferred vacuum cup assembly, showing the effect of the application of vacuum.
Figure 1B:
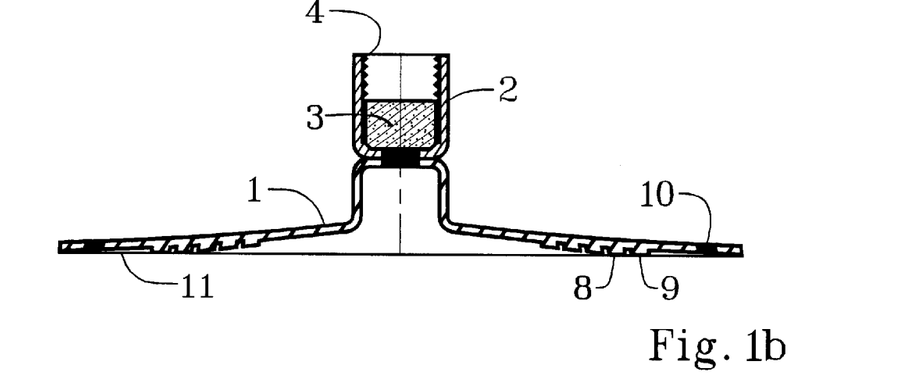
Figure 1C:
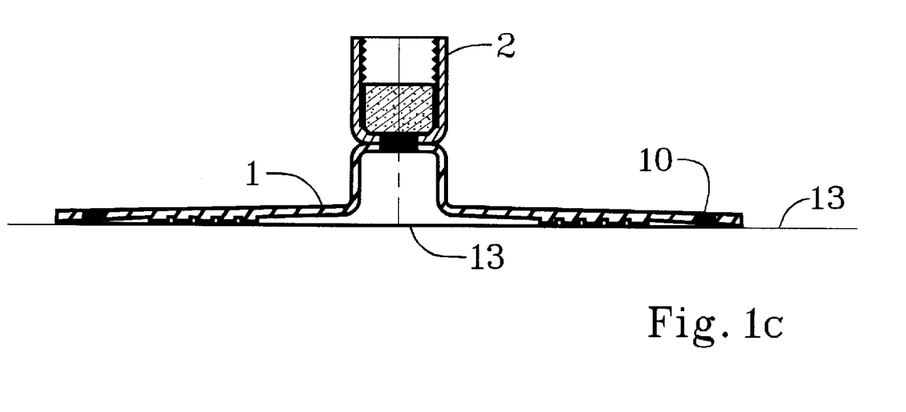
Figure 1D:
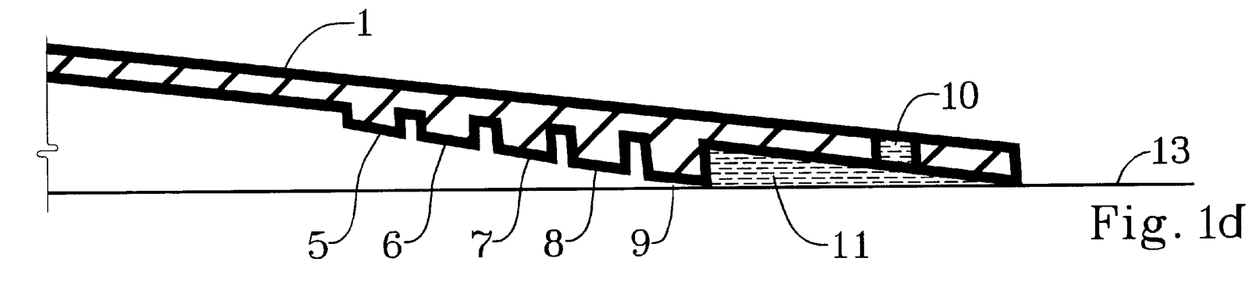
FIGS. 1d, 1e, and 1f are expanded views of portions of the vacuum cup as increasing vacuum is applied.

Referring first to FIGS. 1a and 1d, the vacuum cup assembly comprises a vacuum cup 1 made of a flexible, resilient material and a tubular central stem 2 in which is mounted a filter 3. The outer end 4 of stem 2 is adapted to be attached to a vacuum supply. On the bottom of the vacuum cup 1 is a series of (preferably more than one, as shown) concentric ridges 5, 6, 7, 8, and 9. Near the outer edge of cup 1 is a port 10 for lubricant supply, adapted for attachment to a tube or the like for supplying liquid lubricant to the underside of the vacuum cup 1. In the initial stage of application, lubricant is caused to flow, from a source not shown, through port 10 into space 11 defined by outermost ridge 9 and the edge 12 of the vacuum cup 1.

Figures 1E, 1F:
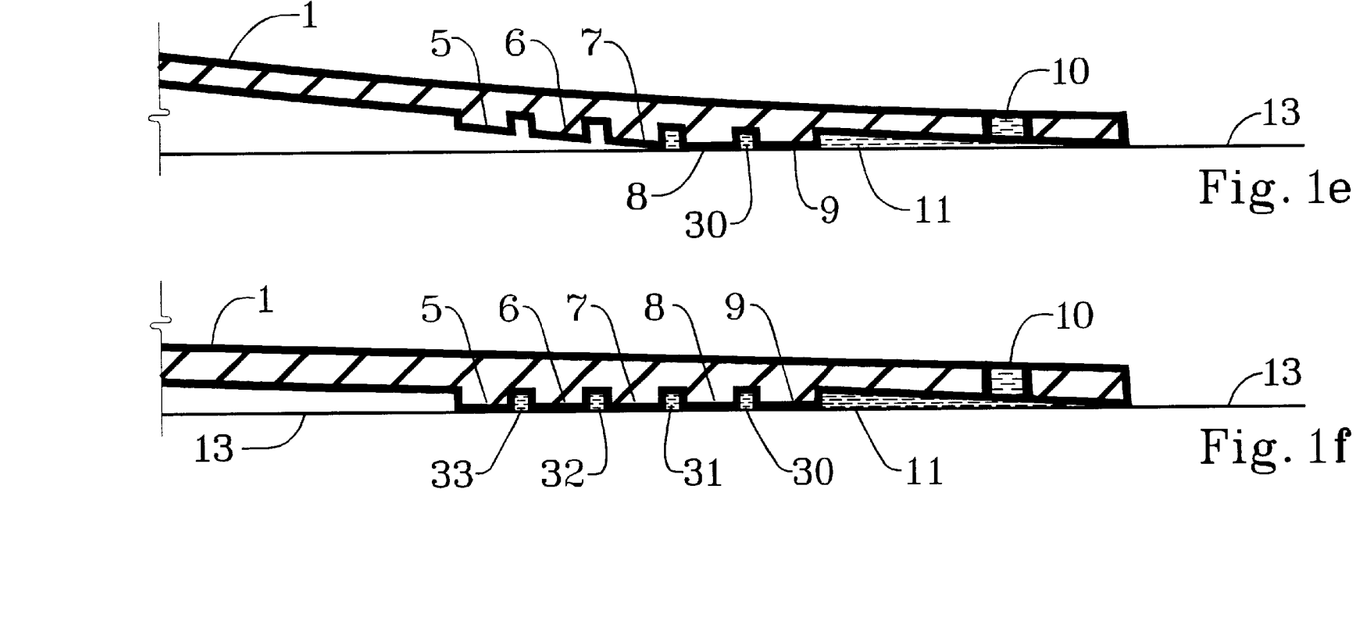

Vacuum may be applied before the beginning of lubricant flow (preferably gradually if it is before) or after the flow begins. Referring to FIGS. 1b and 1e, with the application of vacuum, the vacuum cup 1 begins to flatten and adhere to the surface. As lubricant continues to flow, it accumulates to a degree in space 11 and is drawn into the space between ridges 8 and 9, passing under ridge 9. With the full application of vacuum as depicted in FIGS. 1c and 1f, lubricant is present in all the spaces 30. 31, 32, and 33 between the ridges 5, 6, 7, 8, and 9. The vacuum cup assembly adheres tenaciously to the surface 13 but, because of the presence of the lubricant on surface 13, between the ridges 5–9 and underneath them, the vacuum cup assembly can slide on surface 13 relatively easily. Filter 3 is not essential to the operation of the vacuum cup assembly but is preferred because the vacuum continually draws stray particles from the surface and the air, as well as some lubricant, into the vacuum system. Filter 3 will minimize down time caused by fouling of the vacuum system. In a different preferred configuration, we do not use a filter in the vacuum cup assembly, but pass the vacuum air through a device for removing lubricant from the air and recycling it; this may be done either in individual units for each vacuum cup assembly or, preferably, in a central area where the lubricant is collected.

While a lubricant source near the edge of vacuum cup 1 is preferred, particularly after startup and the unit is proceeding more or less in a single direction, it is not essential that the lubricant contact the bottom surface of the vacuum cup 1 at an outermost point. Port 10 may be located at a point nearer the center of the vacuum cup 1, as the flow of lubricant is to be coordinated with the application of vacuum and the variable directional movement of the robot as a whole, so that a dry portion of vacuum cup 1 will not unnecessarily be forced to move against the work surface. More than one lubricant outlet such as port 10 may be used. The coordination of vacuum, lubricant flow, and power and direction to the wheels (see the discussion with respect to FIGS. 2a and 2b) may be accomplished more or less automatically by appropriately written software or by manual input to the systems which operate each. Any appropriate software and/or control system capable of such coordination may be used. Preferably, the body of vacuum cup 1 is generally conical and shallow, more or less as depicted. As a major objective of our invention is to move the robot while the vacuum cup assembly or assemblies provide adherence to a work surface, it is important to understand the relationship of certain variables relating to the suction cups. For example, the sliding friction, $F_S$, changes as a function of the reaction force due to the suction cup, $R_{SC}$. The reaction force $R_{SC}$ is the tendency of the suction cup to release itself, primarily due to its resilience, from the work surface, but it is also influenced by the weight of the robot, the strength of the vacuum, and the inner and outer areas of the suction cup. Generally the reaction force conforms to the following relationship:

$$\Sigma F_{hor.} = R_{SC} + N + p_v(A_I) - p_a(A_o) = 0$$

$$R_{SC} = p_a(A_o) - N - p_v(A_I)$$

where $R_{SC}$ is the reaction force due to the suction cup characteristics, $P_v$ is the vacuum pressure applied to the suction cup, $P_a$ is the atmospheric pressure acting on the outside of the suction cup, $A_o$ is the outside area of the suction cup, $A_I$ is the inside area of the suction cup, and N is the normal force acting or load applied to the suction cup, usually the vehicle weight. The main variable available for control of a single vacuum cup is the vacuum pressure applied, which generally will be maintained sufficient to overcome the forces tending to release the vacuum cup; however, this will not always be the case where there is more than one vacuum cup assembly, and the microprocessor should be programmed to manipulate the robot accordingly. The sliding friction, $F_S$ varies with the number of concentric ridges actually in contact with the working surface under a given vacuum pressure, as well as the viscosity and lubricity of the lubricant, the frictional characteristics of the working surface and the composition (frictional characteristics) of the vacuum cup body. Sliding function $F_S$ is used as a factor in determining the motive power delivered to the wheels.

Figure 2A:
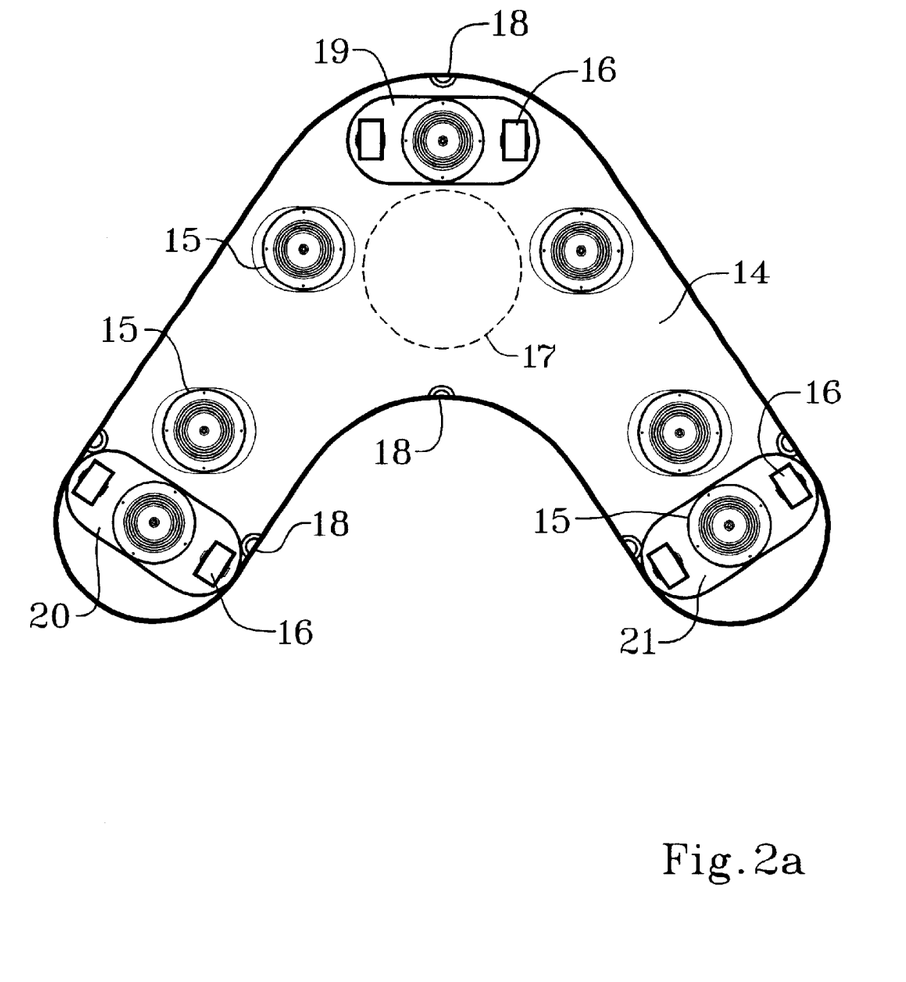
FIGS. 2a and 2b are underneath and sectional views of a preferred form of our robot unit, showing placement of the vacuum cup assemblies and wheel modules.

Referring now to FIG. 2a, robot body 14 is shown in its preferred boomerang shape, viewed from the underside. On the body 14 are vacuum cup assemblies 15 and wheel assemblies 16. Utility socket 17, located on the top surface of body 14, is shown as a dotted line; utility socket 17 is for placement of various kinds of tools, welders, spray tubes or nozzles, dispensers, and the like. They may be in the form of extensible arms so their functions may be performed on portions of the underlying surface somewhat remote from the body 14. Body 14 may also have linking sites 18 for linking the robot bodies together if desired. The boomerang shape is preferred because it enables us to place wheels and vacuum cups in trailing and spaced-apart relation to a lead module 19 of a vacuum cup assembly 15 and wheels 16. Thus the basic configuration of the lead module 19 and the (at least two) trailing modules 20 and 21 in our preferred configuration is more or less triangular. Preferably the modules form the general shape of an equilateral triangle— that is, the three modules 19, 20, and 21 are at the apexes of a triangle, so that as the lead module 19 ascends an inclined or backwardly leaning surface, steering is more controllable than it would be if the rear of the robot were not in contact with the work surface at spaced apart points. It will be appreciated that this stabilizing effect will be facilitated when the robot moves in any direction, and that the relative positions of the working parts—the wheels and vacuum cup assemblies—are significant. Any frame shape (boomerang, triangle, delta or other) for the robot body which accomplishes the desired spacing and achieves the desired stability will suffice. We intend to include in our invention any device for articulation of the body (a body of any shape), such as one or more hinges or motorized hinges which may divide the body into parts. The flexing of the hinges may be controlled remotely along with the other functions of the robot. Modules 19, 20, and 21 may be turned independently in any direction; wheels 16 may also be turned independently in any direction.

Figure 2B:
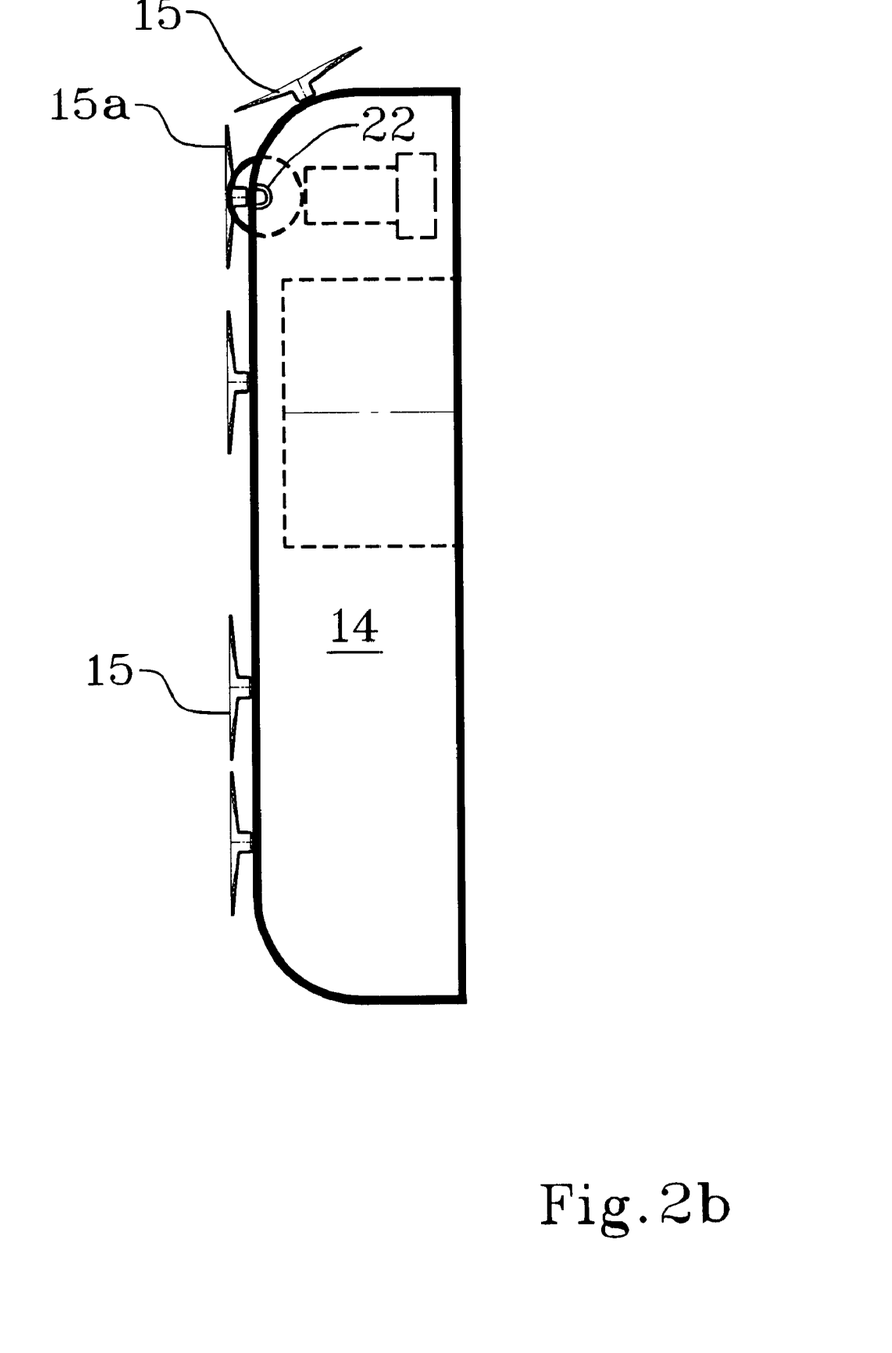

As seen in FIG. 2b, the under side of body 14 is shown in a preferred convex form, but may assume other shapes depending on the kinds of surfaces on which the robot will be used. Vacuum cup assembly 15a is seen to have articulating means 22 for application to a surface which does not conform to the convex curve of body 14. Wheel assemblies 16 (not shown in FIG. 2b) can be extended also so the wheels 19 can reach and make contact on the surface.

Figure 3:
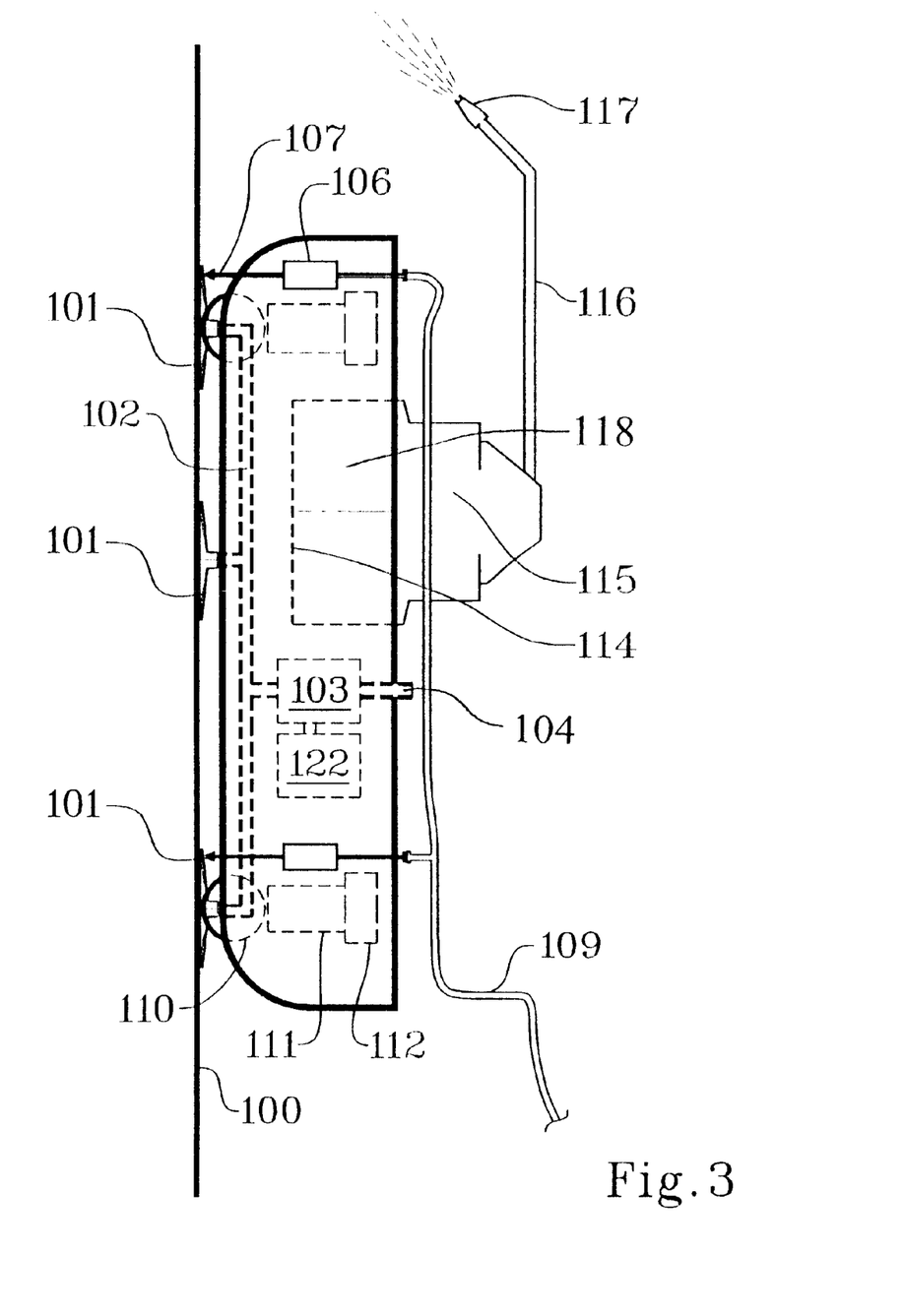
FIG. 3 is a side view of our robot in motion on a ship's hull, performing the task of painting.

In FIG. 3, our robot is seen to be in motion, carrying out a painting task. The robot is on a hull surface 100, traveling upwards. Two vacuum cup assemblies 101 are shown, fully applied—that is, a full vacuum is drawn on them through vacuum lines 102 which may lead to an optional manifold or chamber 103. Vacuum pump 122 is shown to be mounted on the robot body, connected to chamber 103, but chamber 103 may alternatively or in addition be connected by an air line to a remote vacuum source not shown. Lubricant is intermittently or continuously applied to the advancing sides of vacuum cup assemblies 101 by pump 106 through ducts 107 to form a film between the work surface and the vacuum cup, the ultimate lubricant source being a reservoir not shown connected to pump 106 through flexible tube 109. As lubricant is fed through ducts 107, it spreads underneath the vacuum cup assemblies 101, enabling the vacuum cup assemblies 101 to slide freely on surface 100 when motive force is applied through wheels 110. Wheels 110 are urged outward by springs 111 so they will contact surface 100 even if it is convex as the surface 100 may be. The outward urging of the wheels is in conflict with the action of the vacuum cups, but both are controlled appropriately by microprocessor 122. Driving force is applied to wheels 110 by motors 112. Motors 112 can apply variable turning force to wheels 110 and also can turn the wheels 110 to reorient the direction of movement of the robot. Each wheel may have its own integral controller, but a single controller may be used for all wheels on the robot. The controller may receive directions by flexible wire or by radio from a remote microprocesor. As the purpose of the illustrated excursion is to apply paint to a ship's hull (surface 100), a berth in the form of utility socket 114 is equipped with a paint reservoir and pump containing paint tube 116 leading to spray nozzle 117 for spraying paint behind the robot as it moves. The orientation of turret 115 can be controlled by a motor not shown in the utility socket 114. The motor may in turn be controlled by its own controller, not shown, or a central controller located on the robot which may control all functions of the robot—that is, the orientation and powering of wheels 110, variations in vacuum strength to each of the vacuum assemblies, the flow of lubricant to each of the vacuum assemblies, the vacuum source 104, and paint pump 118, as well as the position of turret 115.

It should be noted that while vacuum cup assemblies 101 adhere to surface 100 with a significant tenaciousness as a function of the applied vacuum, wheels 110 must apply traction to move the robot forward, and accordingly the springloaded downward force on wheels 101 is balanced so as not to overcome the vacuum applied in the vacuum cup assemblies 101. This is made possible not only by the programmed microprocessor, but by the use of our lubricant, which permits excellent adhesion by vacuum while also facilitating the sliding of the vacuum cup assemblies on the lubricated surface 100.

Figure 4A:
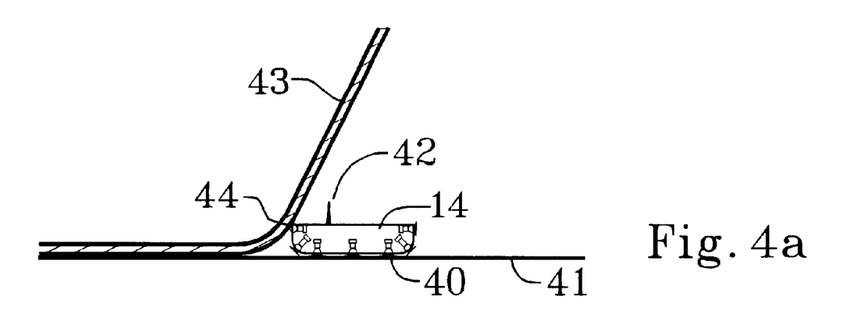
FIGS. 4a–4d represent a sequence of positions of a preferred robot approaching a ship hull and beginning its ascent to a position for use.

Referring now to FIGS. 4a–4d, this series of figures is designed to show how my robot can approach a backwardly inclined surface such as a ship's hull and begin to ascend it to perform a task. In FIG. 4a, the robot 14 is moved from right to left, as depicted, by locomotion provided by wheels 40 contacting horizontal surface or floor 41; the wheels 40 are controlled to direct the robot in the leftward direction by an operator and microprocessor not shown, through radio signals received by antenna 42 and/or wires not shown. The signals are further processed on the robot by a receiver not shown and utilized to manipulate the wheels 40—that is to both steer and power them. At the point illustrated in FIG. 4a, module 44 containing wheels and a vacuum cup assembly on the upper left of robot 14 has made contact with the ship's hull 43. The microprocessor and/or one or more algorithms in a suitable form detects the resistance caused by ship's hull 43 and begins rotating the wheels in contact with ship's hull 43, at the same time also activating the vacuum in the vacuum cup assembly including the step of feeding lubricant to it. The module 44 is able to articulate or tilt to accommodate the angle of ship's hull 43 or other surface. While the wheels in module 44 tend to propel robot 14 upward and backward, following the contour of ship's hull 43, wheels 40 will cease to propel the robot 14 in a leftward direction, as this may tend to jam the robot 14 into the acute angle formed by ship's hull 43 and horizontal surface 41. If the angle is significantly less than that shown, wheels 40 on horizontal surface 41 must be free to rotate in a backwards direction while robot 14 makes its initial upward move on the ship's hull 43.

Figure 4B:
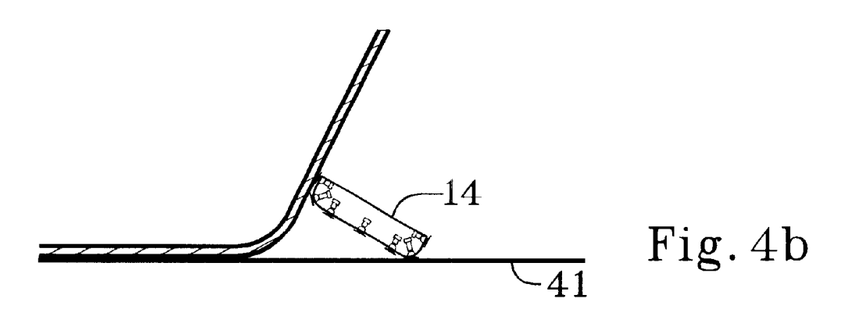
Figure 4C:
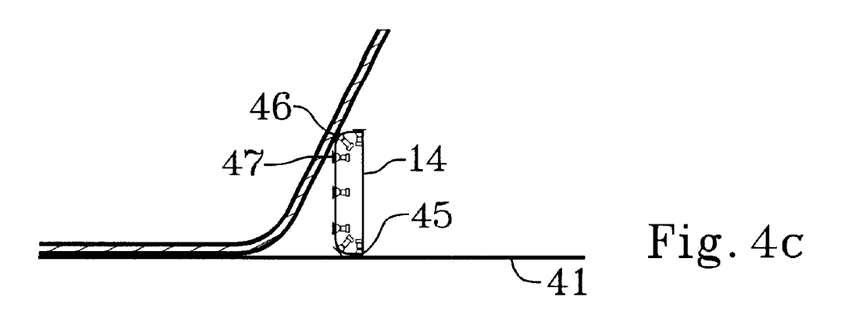
Figure 4D:
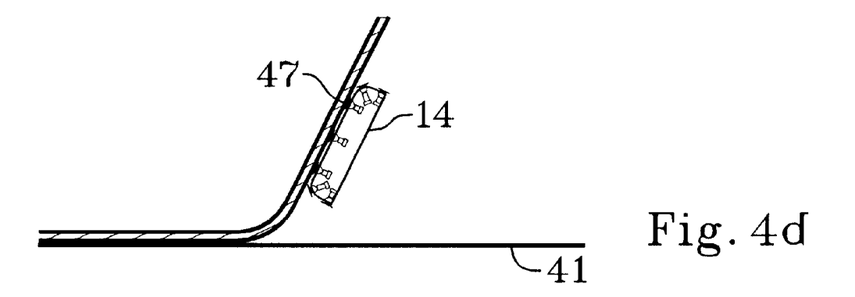

At the position of FIG. 4b, robot 14 has become adhered to ship's hull 43 by at least two vacuum cup assemblies. The wheels on horizontal surface 41 may be reactivated to assist in pushing robot 14 leftward, if they had been inactivated. The robot 14 becomes oriented soon as shown in FIG. 4c, with vacuum cup assemblies and wheel sets 46 and 47 in contact with ship's hull 43. The workings of these sets of wheels and vacuum assemblies will tend to lift the entire robot 14 from horizontal surface 41; however, wheel set 45 at the back corner of robot 14 should continue to push to the left in order to assure orientation of robot 14 on ship's hull 43. This means that module 46 of wheels and a vacuum cup assembly (the uppermost set in contact with the ship's hull) should be released and wheel set and vacuum assembly module 47 (the other ones in contact with the ship's hull) should be directed to slide backwards (that is, in a downward direction on the ship's hull) as the lower end of the robot 14 proceeds leftward and orients robot 14 to an orientation permitting adherence of a maximum number of vacuum cup assemblies and wheel assemblies, as shown in FIG. 4d. This entire procedure may be assisted by a sensor for detecting contact with ship's hull 43. After the position of FIG. 4d is attained, the robot will be ready for any of numerous tasks including ones requiring carrying significant weights of equipment.

Figure 5A:
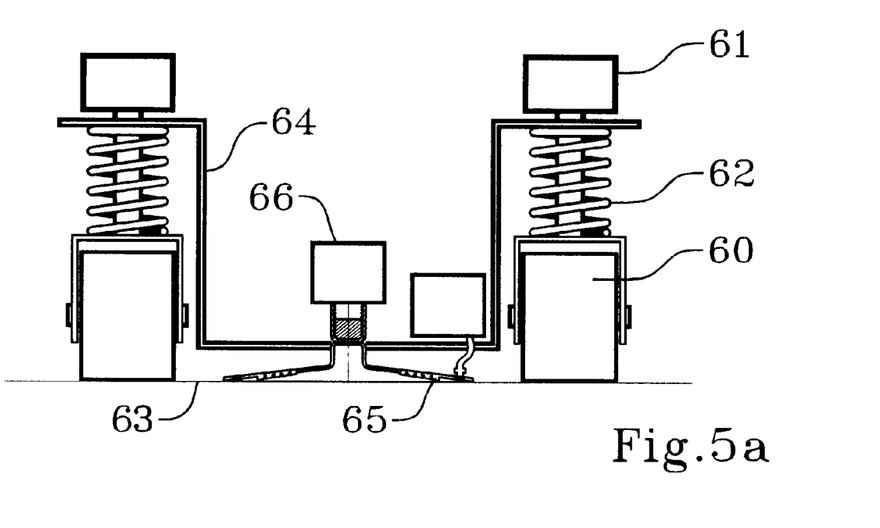
FIGS. 5a and 5b illustrate a vacuum cup assembly used in the invention.
Figure 5B:
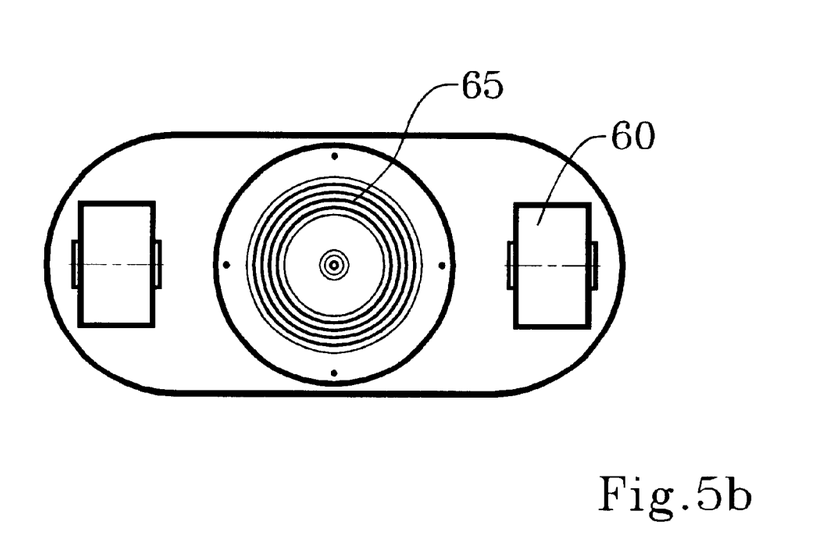

In FIGS. 5a and 5b, wheels 60 are seen to be driven by motor/gear assembly 61, with a spring 62 between to urge the wheels toward the surface 63. A module chassis 64 permits appropriate orientation and alignment of vacuum cup 65, and the individual vacuum pump and motor 66. FIG. 5b is a view from underneath.

Figure 6:
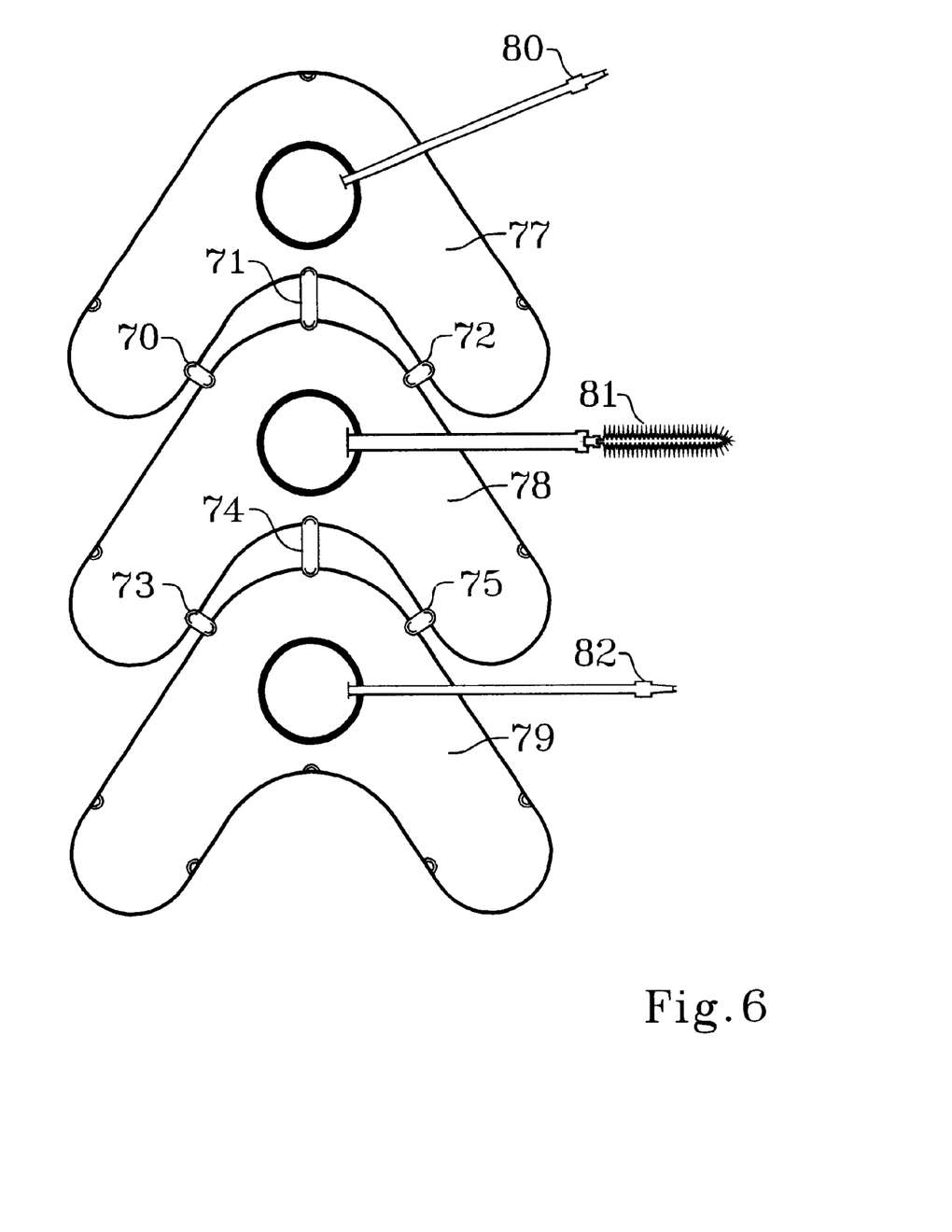
FIGS. 6 and 7 show caravans of robots for performing sequential functions on a work surface.
Figure 7:
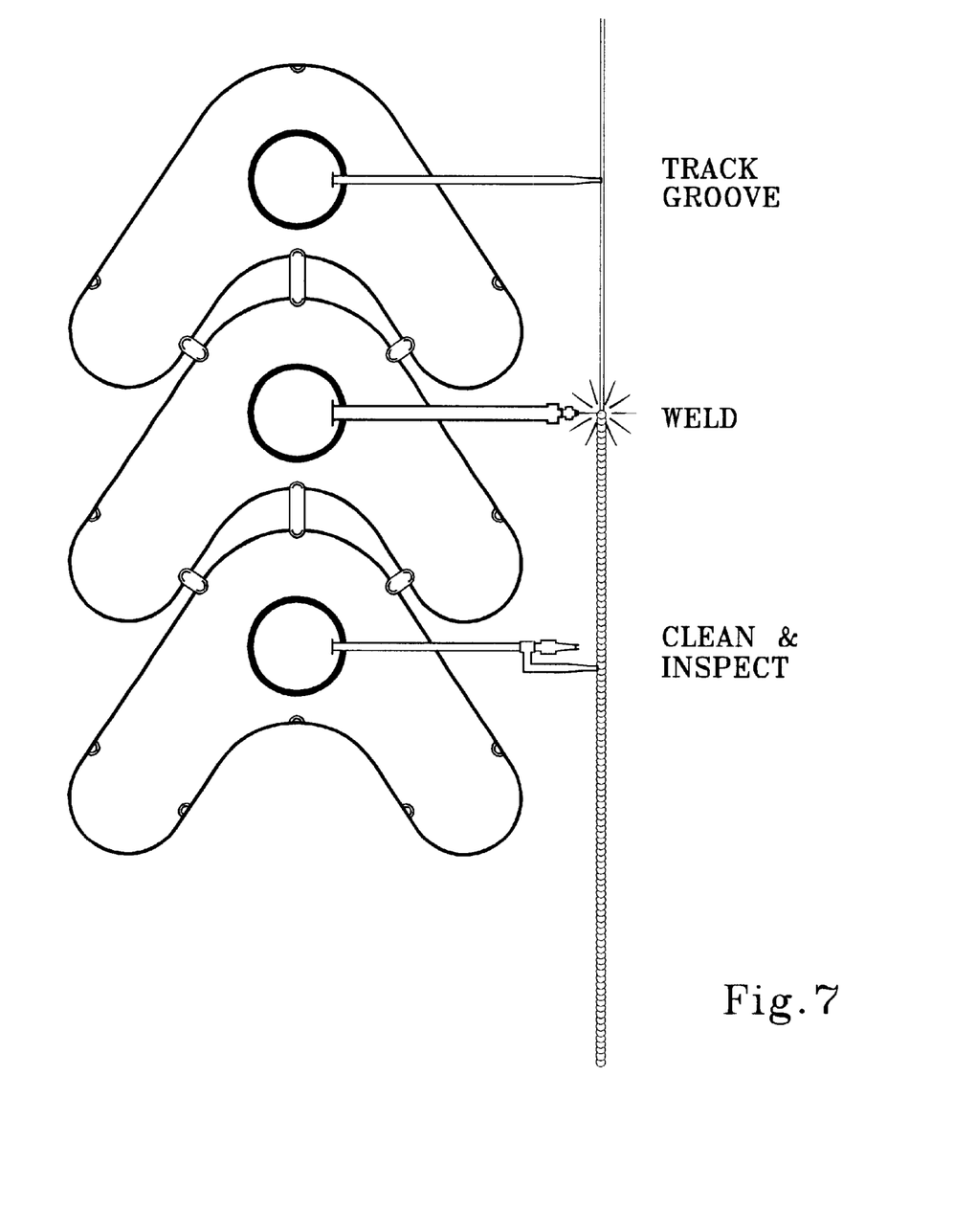

FIG. 6 illustrates the use of linkages 70, 71, 72, 73, 74, and 75, to connect three robot bodies 77, 78, and 79 in a caravan or train so that sequential tasks may be performed. As seen, robot body 77 distributes cleaning fluid through spray nozzle 80 onto the work surface, the following robot body 78 employs a brush 81 to abrade the work surface having been spread with cleaning fluid, and the last robot body 79 sprays a rinse solution onto the work surface through nozzle 82 after the brush 81 has assisted the cleaning solution.

We may use any suitable liquid lubricant which may be fed through the vacuum cup as shown and illustrated, to spread on the work surface, for the vacuum cups to contact. Fatty acids, glycerols, triglycerols, graphite lubricant, vegetable and mineral oil, and petroleum oils may be used. Preferably the lubricant will be nonflammable and readily removed from the work surface by water.

What is claimed is:

1. A vacuum cup assembly including a vacuum cup comprising a stem member and a flexible, substantially conical body, a port in said body for a vacuum source, at least two annular ridges projecting downwardly from said body for intimately contacting a base surface, and at least one port for introducing lubricant to an interface of at least one of said ridges and the base surface.

2. A vacuum cup assembly of claim 1 including a filter in said vacuum source port.

3. A vacuum cup assembly of claim 1 wherein said flexible body has at least three annular ridges, said annular ridges being substantially concentric.

4. A vacuum cup assembly of claim 1 mounted on a chassis including means for attaching a task-performing device to said chassis.

5. A vacuum cup assembly of claim 4 including powered wheels for moving said chassis.

6. A vacuum cup assembly of claim 5 wherein said wheels are powered by motors on said vehicle and are capable of being independently steered.

7. Method of manipulating a robot on a working surface comprising drawing a vacuum on at least one vacuum cup having a flexible surface for adhering to a working surface, feeding a lubricant to said flexible surface to form a film between said flexible surface and said working surface, and activating a locomotion means to propel said robot in a desired direction.

8. Method of claim 7 wherein said locomotion means are wheels.

9. Method of claim 7 wherein the reaction force $R_{SC}$ of said vacuum cup is determined at least partly by the relationship $$R_{SC}=p_a(A_O)-N-p_V(A_I)$$

where $R_{SC}$ is the reaction force, $P_V$ is the vacuum pressure applied to the suction cup, $p_a$ is the atmospheric pressure acting on the outside of the suction cup, $A_O$ is the outside area of the suction cup, $A_I$ is the inside area of the suction cup, and N is the normal force acting or load applied to the suction cup, usually the vehicle weight.

10. A robot comprising at least one robot module comprising (a) a locomotion section comprising locomotion means for moving said module on a work surface, and (b) a slidable adherence section for adhering said module to a work surface while said module is moving thereon and a means for feeding a lubricant to said slidable adherence section to form a film between said slidable adherence section and said work surface.

11. A robot of claim 10 wherein said locomotion section comprises at least one wheel, a motor therefor, and means for steering said wheel.

12. A robot of claim 10 wherein said slidable adherence section comprises a vacuum cup having a top side and an underside, a lubricant port therein, and a duct for delivering lubricant through said duct to the underside of said vacuum cup.

13. A robot of claim 10 wherein said slidable adherence section comprises a vacuum cup having a stem member, a flexible, substantially conical body, a port in said body for a vacuum source, at least two substantially concentric annular ridges projecting downwardly therefrom for intimately contacting a base surface, and at least one port for introducing lubricant to an interface of at least one of said ridges and the base surface.

14. A robot of claim 10 including at least one spring for urging said wheel toward said work surface.

15. A robot of claim 10 including a berth for a specific task-performing device.

16. A robot of claim 10 including an antenna for receiving control signals.

17. A robot of claim 10 including a flexible tube for connection to a remote source of vacuum.

18. A robot of claim 10 including a flexible wire for connection to a remote source of electric power.

19. A robot of claim 10 including a flexible tube for connection to a remote source of lubricant.

20. A robot of claim 10 including a microprocessor for controlling at least one function on said robot.

* * * * *